United States Patent [19]

Sliger et al.

[11] 4,257,553
[45] Mar. 24, 1981

[54] VALVE CONSTRUCTION AND METHOD OF MAKING THE SAME

[75] Inventors: Boyd P. Sliger, Concord; Everett T. Steele, Jr., Knoxville, both of Tenn.

[73] Assignee: Robertshaw Controls Company, Richmond, Va.

[21] Appl. No.: 890,606

[22] Filed: Mar. 20, 1978

[51] Int. Cl.$^3$ .......................................... G05D 23/12
[52] U.S. Cl. ................................... 236/34.5; 251/333
[58] Field of Search ............... 236/34, 34.5; 251/333, 251/210, 332

[56] References Cited

U.S. PATENT DOCUMENTS

| | | | |
|---|---|---|---|
| 1,697,516 | 1/1929 | Hele-Shaw et al. | 251/210 X |
| 2,403,028 | 7/1946 | Smith | 251/210 |
| 2,519,541 | 8/1950 | Bryant | 251/332 |
| 2,650,793 | 9/1953 | Clark, Jr. et al. | 251/333 X |
| 2,873,070 | 2/1959 | Drapeau | 236/1 EA |
| 3,248,056 | 4/1966 | Obermaier | 236/34 |
| 3,332,437 | 7/1967 | Hallen | 251/332 X |
| 3,779,512 | 12/1970 | Scaramucci | 251/308 |
| 3,858,800 | 1/1975 | Wong | 236/34 |

*Primary Examiner*—William E. Tapolcai, Jr.
*Attorney, Agent, or Firm*—Candor, Candor & Tassone

[57] ABSTRACT

A valve construction having a valve seat and a movable valve member for opening and closing the valve seat and being operatively interconnected to a thermal power element carried by the valve construction, the valve member having an annular metallic part for engaging the valve seat to close the same and having an annular flexible elastomeric part for also engaging the valve seat upstream from the metallic part to augment the closing of the valve seat. The annular flexible elastomeric part is molded to the metallic part to be carried thereby.

12 Claims, 6 Drawing Figures

VALVE CONSTRUCTION AND METHOD OF MAKING THE SAME

BACKGROUND OF THE INVENTION

1. Field of the Invention

This invention relates to an improved thermostatically operated valve construction and method of making the same.

2. Prior Art Statement

It is known to provide a valve construction having a valve seat and a movable valve member for opening and closing the valve seat and being operatively interconnected to a thermal power element carried by the valve construction, the valve member having an annular metallic part for engaging the valve seat to close the same and having an annular flexible part for also engaging the valve seat upstream from the metallic part to augment the closing of the valve seat.

For example, see the following three U.S. Patents:
(1) U.S. Pat. No. 2,873,070—Drapeau
(2) U.S. Pat. No. 3,057,372—Sutton et al
(3) U.S. Pat. No. 3,540,472—Brady et al It appears that the valve constructions of items (1), (2) and (3) above each has a main valve member for closing against a valve seat together with an annular flexible member being carried by the valve member for engaging the valve seat outboard of the main valve member and upstream therefrom, the annular flexible part not being attached to the main valve member but merely being held against the same by clamping means or being movable relative thereto.

SUMMARY OF THE INVENTION

It is a feature of this invention to provide a valve member with an annular flexible elastomeric part for also engaging a valve seat upstream from the valve member to augment the closing of the valve seat by the valve member.

It was found according to the teachings of this invention that such an annular flexible elastomeric part can be molded to the metallic part of the valve member to be carried thereby whereby an ease of manufacturing and assembling is provided by this invention.

In particular, one embodiment of this invention provides a valve construction having a valve seat and a movable valve member for opening and closing the valve seat and being operatively interconnected to a thermal power element carried by the valve construction, the valve member having an annular metallic part for engaging the valve seat to close the same and having an annular flexible elastomeric part for also engaging the valve seat upstream from the metallic part to augment the closing of the valve seat. The annular flexible elastomeric part is molded to the metallic part to be carried thereby.

In this manner, when the valve member is disposed in its closed position against the valve seat, the elastomeric part is not subjected to the excessive seating load of a return spring of the valve construction and the load due to the fluid acting upon the valve member but rather the integrity of the seat is dependent upon the natural resilience of the elastomeric part and the fluid pressure urging that portion of the elastomeric part against the valve seat. Thus, since the elastomeric part of the valve member of this invention is not subjected to the excessive spring and poppet pressure loading, there is very little tendency for the elastomeric part to exhibit excessive compression set and lose its sealability. Also, any contaminate being trapped between the elastomeric part and the valve seat will not tend to become embedded into the elastomeric part to damage the valve seat whereby the subsequent opening of the valve member will result in a flow through the valve seat that will tend to wash the contaminates off of the seat area and/or elastomeric part.

Accordingly, it is an object of this invention to provide an improved valve construction having one or more of the novel features of this invention as set forth above or hereinafter shown or described.

Another object of this invention is to provide an improved method of making such a valve construction or the like, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
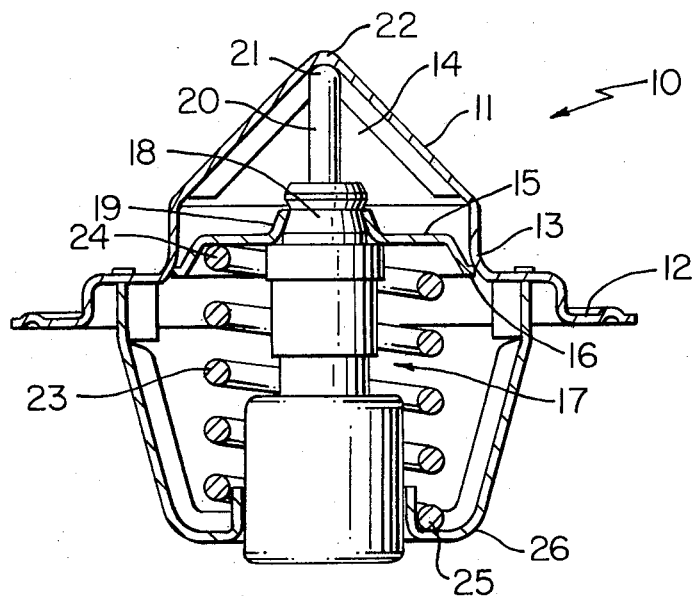
FIG. 1 is a cross-sectional view illustrating a prior art valve construction.

While the various features of this invention are hereinafter described and illustrated as being particularly adapted to provide a valve construction for the cooling system of an internal combustion engine for a vehicle such as an automobile, it is to be understood that the various features of this invention can be utilized singly or in any combintion thereof to provide a valve construction for other devices as desired.

Therefore, this invention is not to be limited to only the embodiment illustrated in the drawings, because the drawings are merely utilized to illustrate one of the wide variety of uses of this invention.

A prior valve construction is generally indicated by the reference numeral 10 in FIGS. 1-3 and will be first generally described in order to fully point out the improvement being provided by the valve construction of this invention that is generally indicated by the reference numeral 10A in FIGS. 4-6 and will later be described.

Figure 3:
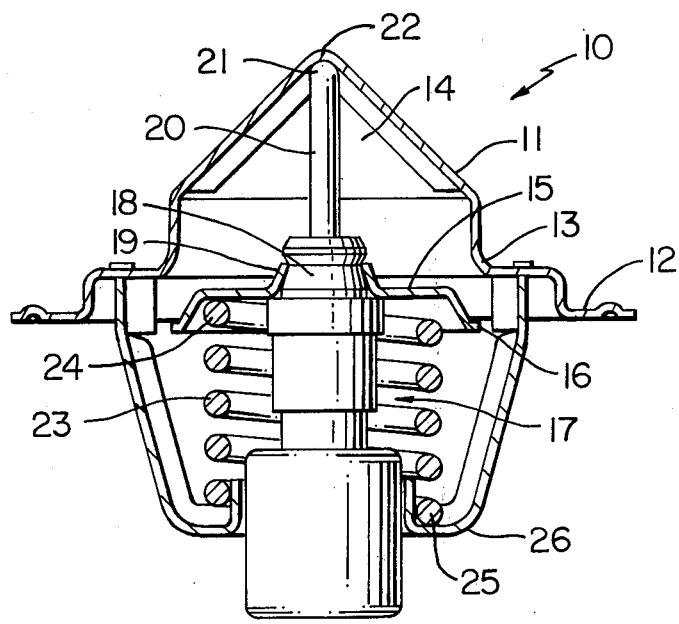
FIG. 3 is a view similar to FIG. 1 and illustrates the valve construction in an open condition thereof.
Figure 2:
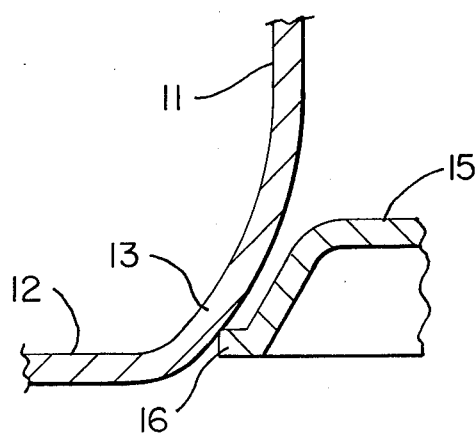
FIG. 2 is an enlarged fragmentary view of part of the valve construction of FIG. 1 and illustrates the valve seat and valve member thereof.

As illustrated in FIGS. 1-3, the typical automobile type thermostat construction comprises a metallic flange member 11 having an outwardly directed peripheral portion 12 for being clamped in a coolant passage means of the automobile so that coolant fluid must pass through a valve seat portion 13 of the flange member 11 and out through opening means 14 thereof when a movable valve member 15 of the valve construction 10 is disposed in an open condition as illustrated in FIG. 3, the movable valve member 15 comprising a substantially cup-shaped metallic member with the outer peripheral portion 16 thereof being adapted to engage against the valve seat portion 13 of the stationary flange member 11 to close the valve seat portion 13 in the manner illustrated in FIG. 2.

A conventional piston and cylinder type of thermal power element that is generally indicated by the reference numeral 17 has its cylinder 18 secured to the inner peripheral portion 19 of the valve member 15 while the piston 20 thereof has its free end 21 bearing against the apex portion 22 of the stationary flange member 11 so that upon expansion of a petroleum base wax material contained within the cylinder 18 through heating thereof, the cylinder 18 will be moved downwardly relative to the piston 20 from the position illustrated in FIG. 1 to the position illustrated in FIG. 3 in opposition to the force of a compression spring 23 to open the valve member 15 away from the valve seat 13 to permit coolant fluid to pass through the valve construction 10. However, upon the subsequent cooling of the wax charge in the thermal power element 17, such wax charge contracts and thereby permits the force of the compression spring 23 to move the cylinder 18 upwardly relative to the piston 20 and, thus, move the valve member 15 upwardly from its open position illustrated in FIG. 3 to its closed position illustrated in FIG. 1, the compression spring 23 having one end 24 bearing against the valve member 15 while the other end 25 thereof bears against a bracket member 26 secured by the flange member 11.

Such operation and structure of the prior art valve construction 10 is similar to the arrangement set forth in the afore-mentioned U.S. Pat. to Drapeau, No. 2,873,070.

It has been found according to the teachings of this invention that there is a tendency for some automotive type water cooled internal combustion engines to reject an insufficient amount of heat generated by the process of combustion to the cooling medium to sufficiently heat the engine to a temperature for efficient operation and to provide adequate heat for operator and passenger comfort, especially during vehicle operation in periods of very low ambient temperature.

One principle cause of this condition is that the coolant fluid which is allowed to pass through the thermostat valve, such as the valve construction 10 previously described, as leakage when the valve construction is closed and supposedly blocking flow to the radiator, due to imperfections, out-of-round, etc., of the valve member flange 16 and the valve seat area 13.

In the past, one of the solutions to this problem was to provide the poppet valve member 15 with a cover of rubber or other elastomeric material in order to provide a leak-tight seat against the valve seat area 13. This can be accomplished by disposing the covering on the poppet valve member 15 or by providing an insert or covering in the mating valve seat area 13. However, it was found that this prior known structure resulted in several undesirable qualities.

In particular, automotive type thermostats are generally of the power element type, such as the valve construction 10 that employs the thermal power element 17, and depend upon the expansion of a petroleum base wax to open the poppet valve member and a load spring to return the poppet valve member to seat when cooled.

The return spring, most generally, exerts a relatively high load on seat to minimum leakage and insure proper seating. This relatively high load (generally 10-25 pounds) action upon the near line contact seat area can result in an extremely high unit loading on the seat members. When these seat members are provided with an elastomer directly on the line seat, after a relatively short period of use, a narrow groove will be formed in the elastomer and during subsequent closing, if the poppet valve member is not perfectly aligned with the mating flange and the previously formed groove, excessive leakage can result passing coolant to the radiator and resulting in over cooling of the engine. This condition can be made worse if contaminates in the cooling system such as core sand, slag, etc., become wedged between the seat members during the closing and become embedded in the elastomer.

It was found according to the teachings of this invention that the afore-mentioned adverse problems can be overcome if an annular flexible elastomeric part is carried by the main valve member to also close against the valve seat area on the upstream side of the main valve member. In order to provide such annular flexible elastomeric part for the main valve member, it was also found according to the teachings of this invention that such elastomeric part can be molded directly on the main valve member to be carried thereby so as to minimize the steps in the subsequent assembly procedure as well as render the valve member to be self-contained. This feature also permitted the use of the same parts of the prior known valve construction without further modification thereof to accept such molded part.

Figure 4:
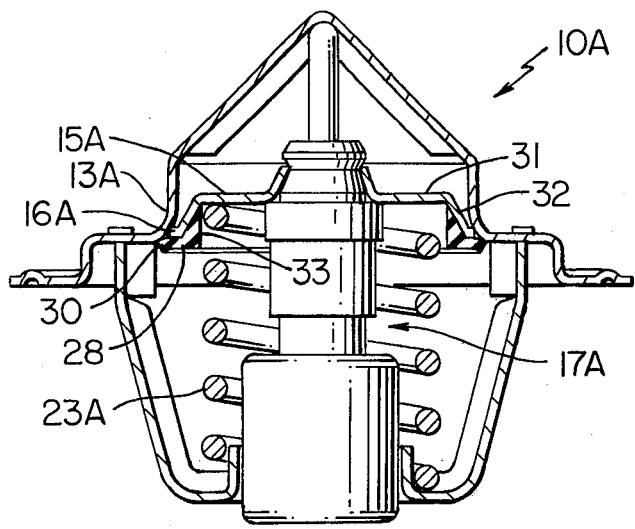
FIG. 4 is a view similar to FIG. 1 and illustrates the improved valve construction of this invention.
Figure 5:
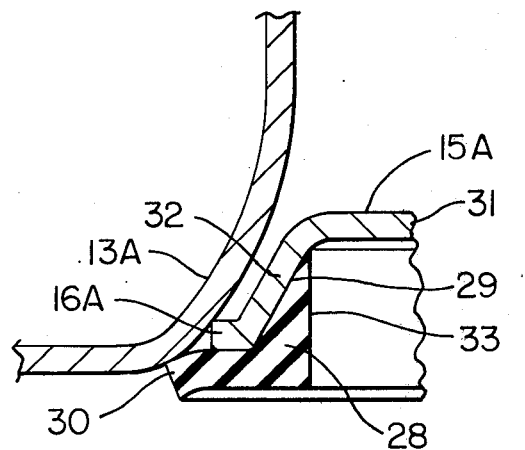
FIG. 5 is an enlarged fragmentary view of a portion of the valve construction of FIG. 4 and illustrates the valve member and valve seat thereof.
Figure 6:
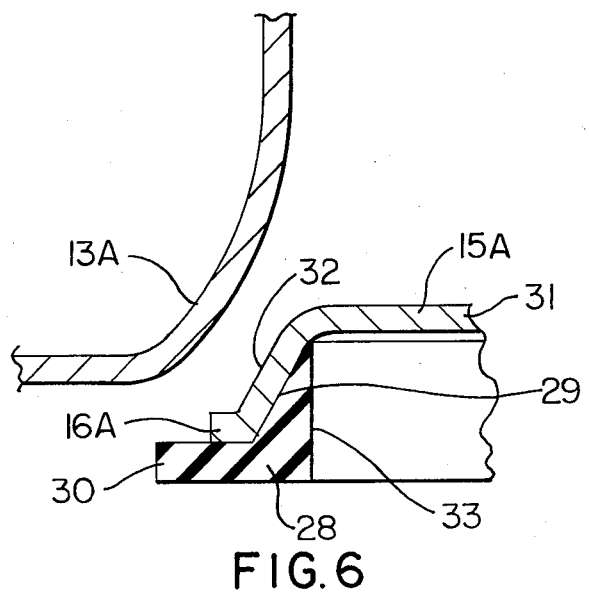
FIG. 6 is a view similar to FIG. 5 and illustrates the valve member in its open condition relative to the valve seat.

Accordingly, reference is now made to FIGS. 4-6 wherein the improved valve construction of this invention is generally indicated by the reference numeral 10A and parts thereof similar to the prior art valve construction 10 previously described are indicated by like reference numerals followed by the reference letter "A".

As illustrated in FIGS. 4-6, it can be seen that an annular flexible elastomeric part 28 is molded to one side 29 of the valve member 15A so that a portion 30 of the part 28 extends radially outwardly beyond the outwardly directed annular metallic portion 16A of the valve member 15A and be parallel and adjacent thereto so as to engage against the valve seat portion 13A in the manner illustrated in FIG. 5. In this manner, the resilient part 30 will engage the valve seat 13A upstream from the point where the metallic part 16A engages against the metallic valve seat 13A, the part 30 flexing in its engagement against a less steeper portion of the arcuate convex valve seat area 13A than where the part 16A engages the valve seat 13A area.

In order to insure that the elastomeric part 28 will be firmly secured to the side 29 of the valve member 15A so that the valve member 15A will be self-contained, the part 28 is molded not only against the flange portion 16A, but also along substantially the entire side wall of the valve means 15A. In particular, the valve member 15A is substantially cup-shaped to define a closed end 31 spaced from the valve seat engaging part 16A by an angled side wall 32, the side wall 32 being relatively long and having the resilient part 28 molded completely along the same as indicated so that the molded part 28 defines an inner peripheral surface 33 that is substantially parallel to the direction of movement of the valve member 15A and defines a cylindrically shaped configuration terminating short of the flat end 31 of the cup-shaped valve member 15A.

In this manner, the molded member 28 will not interfere with the compression spring 23 while still having a relatively large area thereof molded directly to the side 29 of the valve member 15A so that the same will be firmly secured to the valve member 15A.

In this manner, the inner peripheral surface 33 of the elastomeric part is spaced a relatively large distance inwardly from the high flow area of the open valve seat area 13A so that the high fluid flow will not tend to work under the part 28 at its inner juncture with the side 29 of the valve member and thereby work loose the molded part 28 from the valve member 15A which might be the case if the part 28 had its inner peripheral surface 33 closer to the flange portion 16A of the valve member 15A.

Also, the inner peripheral surface 33 of the molded part 28 helps to guide the compression spring 23A in its assembly with the valve member 15A as well as during the operation of the valve construction 10A.

Accordingly, it can be seen that by molding the part 28 to the valve member 15A according to the method of this invention, the various parts of the valve construction 10 previously described in connection with FIGS. 1-3 need not be modified to accept the improved molded part 28 of this invention that causes the resulting valve construction 10A to operate in an improved manner now to be described.

When the coolant being controlled by the valve construction 10A is at a temperature that causes the thermal power element 17A to expand and hold the valve member 15A in the open condition illustrated in FIG. 6, it can be seen that the resilient part 28 of this invention does not impede any flow through the opened valve seat portion 13A.

Subsequently, should the thermal power element 17A cool sufficiently to permit the valve member 15A to close under the force of the compression spring 23A, the closing of the valve member 15A causes the peripheral portion 30 of the resilient part 28 to first engage against the valve seat 13A before the metallic part 16A engages against the valve seat 13A. However, since the resilient portion 30 will flex, the metallic part 16A is adapted to subsequently fully seat against the valve seat portion 13A in the manner illustrated in FIG. 5 to close the valve seat 13A. The resilient member 28 also engages against the closed valve seat 13A to seal the same completely around the periphery of the metallic part 16A to completely reduce any leakage through the valve seat 13A that might be caused by the aforementioned defects of out-of-roundness, etc. between the parts 16A and 13A.

Thus, with the valve member 15A being on seat under the force of the compression spring 23A, the elastomeric part 28 is not subjected to the excessive seating load of the spring 23A and load due to the fluid pressure acting on the valve member 15A but rather the integrity of the seat is dependent upon the natural resiliency of the elastomeric part 28 and the coolant pressure urging that portion 30 of the elastomeric part 28 protruding outside the periphery of the metallic part 16A against the valve seat 13A. Since the elastomeric part 28 is not subjected to the excessive spring and poppet loading, there is very little tendency for the elastomeric part 28 to exhibit excessive compression set and lose sealability. Also, any contaminate being trapped between the elastomeric section 30 and the valve seat 13A will not tend to be embedded into the elastomeric section 30 to damage it whereby subsequent opening of the valve member 15A upon increased temperature sensed by the thermal power element 17A will cause the flow of fluid through the valve seat 13A to wash away the contaminates that were trapped between the flexible portion 30 and the valve seat 13A.

Therefore, it can be seen that the prior art valve construction 10 can be effectively and simply modified by the method of this invention to produce an improved valve construction 10A without requiring any changes in the manufacture of the parts of the valve construction 10 as the only part 28 added thereto can be provided without a change in any other parts of the prior art valve construction 10.

While any suitable material can be utilized for the flexible manner 28 of this invention to function in the above manner, one embodiment that has operated satisfactorily included a valve member 15A formed of stainless steel type 430 with a nitrile rubber part 28 molded thereon by the Precision Rubber Products Corporation of Lebanon, Tenn., the nitrile rubber part 28 comprising Precision Rubber Products Corporation nitrile rubber compound No. 40335 having a durometer rating of approximately 70.

Accordingly, the term "elastomeric" as utilized above and in the appended claims is intended to cover all suitable materials, whether of various types of rubber or plastic or combinations thereof, and this invention is not to be limited to the above specified example.

Thus, it can be seen that this invention provides an improved valve construction as well as an improved method of making such a valve construction or the like.

While the form and method of this invention, now preferred, have been illustrated and described as required by the Patent Statute, it is to be understood that other forms and method steps can be utilized and still fall within the scope of the appended claims.

What is claimed is:

1. In a valve construction having a valve seat and a movable valve member for opening and closing said valve seat and being operatively interconnected to a thermal power element carried by said valve construction, said valve member having an annular metallic part for engaging said valve seat to close the same and having an annular flexible elastomeric part for also engaging said valve seat upstream from said metallic part to augment said closing of said valve seat, the improvement wherein said annular flexible elastomeric part is molded to said metallic part to be carried thereby, said annular metallic part of said valve member including a flat thin washer-like outer peripheral portion disposed substantially transverse to the direction of movement of said valve member and having opposed flat substantially parallel sides, said annular flexible elastomeric part also including a flat thin washer-like outer peripheral portion disposed substantially transverse to the direction of movement of said valve member and having opposed flat substantially parallel sides that extend radially beyond said flat portion of said metallic part and immediately adjacent thereto, said valve member comprising a cup-shaped metallic member having a closed end and an open end, said annular metallic part defining said open end thereof, said cup-shaped metallic member having an annular side wall interconnecting said closed end with said annular metallic part, said annular flexible elastomeric part also being molded to said annular side wall of said cup-shaped metallic member, and a compression spring being carried by said valve construction and having one end bearing against said closed end of said cup-shaped metallic member to tend to close said valve member against said valve seat, said compression spring being disposed inboard of said annular flexible elastomeric part.

2. A valve construction as set forth in claim 1 wherein said valve seat is annular and has a convex arcuate cross-sectional configuration facing said valve member.

3. A valve construction as set forth in claim 2 wherein the area of said valve seat where said metallic part of said valve member engages is steeper relative to the direction of movement of said valve member than the area of said valve seat where said flexible elastomeric part of said valve member engages the same.

4. A valve construction as set forth in claim 3 wherein said area of said valve seat that said flexible elastomeric part of said valve member engages is substantially transverse to the direction of movement of said valve member.

5. A valve construction as set forth in claim 1 wherein said side wall of said cup-shaped metallic member is angled relative to said direction of movement of said valve member, said annular flexible elastomeric part defining an inner peripheral surface thereof that is disposed substantially parallel with said direction of movement of said valve member.

6. A valve construction as set forth in claim 5 wherein said inner peripheral surface of said annular flexible elastomeric part is substantially cylindrical and disposed substantially transverse to said flat outer peripheral portion thereof, said flat outer peripheral portion having one of said flat sides thereof extending to said inner peripheral surface and being substantially transverse thereto.

7. In a method of making a valve construction having a valve seat and a movable valve member for opening and closing said valve seat and being operatively interconnected to a thermal power element carried by said valve construction, said valve member having an annular metallic part for engaging said valve seat to close the same and having an annular flexible elastomeric part for also engaging said valve seat upstream from said metallic part of augment said closing of said valve seat, the improvement comprising the steps of molding said annular flexible elastomeric part to said metallic part to be carried thereby, forming said annular metallic part of said valve member to include a flat thin washer-like outer peripheral portion disposed substantially transverse to the direction of movement of said valve member and having opposed flat substantially parallel sides, forming said annular flexible elastomeric part to also include a flat thin washer-like outer peripheral portion disposed substantially transverse to the direction of movement of said valve member and having opposed flat substantially parallel sides that extend radially beyond said flat portion of said metallic part and immediately adjacent thereto, forming said valve member to comprise a cup-shaped metallic member having a closed end and an open end with said annular metallic part defining said open end thereof, forming said cup-shaped metallic member to have an annular side wall interconnecting said closed end with said annular metallic part, also molding said annular flexible elastomeric part to said annular side wall of said cup-shaped metallic member, providing a compression spring to be carried by said valve construction and have one end bearing against said closed end of said cup-shaped metallic member to tend to close said valve member against said valve seat, and disposing said compression spring inboard of said annular flexible elastomeric part.

8. A method of making a valve construction as set forth in claim 7 and including the step of forming said valve seat to be annular and have a convex arcuate cross-sectional configuration facing said valve member.

9. A method of making a valve construction as set forth in claim 8 and including the step of forming the area of said valve seat where said metallic part of said valve member engages to be steeper relative to the direction of movement of said valve member than the area of said valve seat where said flexible elastomeric part of said valve member engages the same.

10. A method of making a valve construction as set forth in claim 9 and including the step of forming said area of said valve seat that said flexible elastomeric part of said valve member engages to be substantially transverse to the direction of movement of said valve member.

11. A method of making a valve construction as set forth in claim 7 and including the steps of forming said side wall of said cup-shaped metallic member to be angled relative to said direction of movement of said valve member, and forming said annular flexible elastomeric part to define an inner peripheral surface thereof that is disposed substantially parallel with said direction of movement of said valve member.

12. A method of making a valve construction as set forth in claim 11 and including the steps of forming said inner peripheral surface of said annular flexible elastomeric part to be substantially cylindrical and disposed substantially transverse to said flat outer peripheral portion thereof, and forming said flat outer peripheral portion to have one of said flat sides thereof extending to said inner peripheral surface and be substantially transverse thereto.

* * * * *

UNITED STATES PATENT AND TRADEMARK OFFICE
CERTIFICATE OF CORRECTION

PATENT NO. : 4,257,553
DATED : March 24, 1981
INVENTOR(S) : Boyd P. Sliger et al It is certified that error appears in the above—identified patent and that said Letters Patent is hereby corrected as shown below:

Column 7, line 42, delete "of" (first occurrence) and insert --to--.

Signed and Sealed this

Eleventh Day of August 1981

[SEAL]

Attest:

Attesting Officer

GERALD J. MOSSINGHOFF
Commissioner of Patents and Trademarks